July 2, 1929.  E. H. SHAFF  1,719,243
METHOD OF MAKING PISTON RODS
Filed Aug. 10, 1925
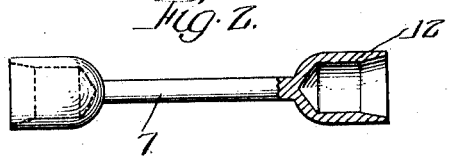
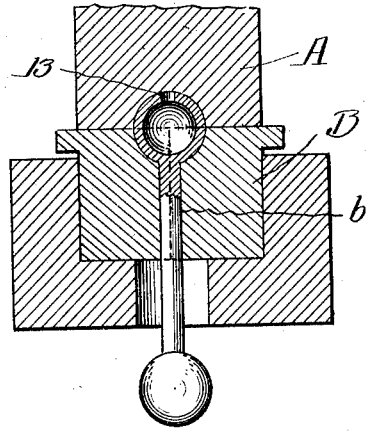
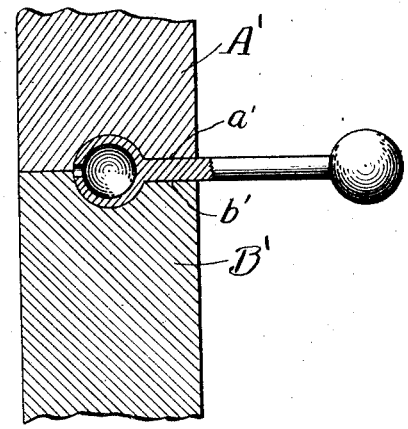
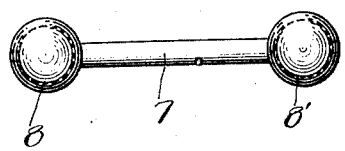
Inventor:
Ernest H. Shaff,
By Lindahl, Parker & Carlson
Attys.

Patented July 2, 1929.

1,719,243

UNITED STATES PATENT OFFICE.

ERNEST H. SHAFF, OF GRAND HAVEN, MICHIGAN, ASSIGNOR TO WM. H. KELLER, INC., OF GRAND HAVEN, MICHIGAN, A CORPORATION OF MICHIGAN.

METHOD OF MAKING PISTON RODS.

Application filed August 10, 1925. Serial No. 49,182.

The invention relates to piston rods of the type employed in pneumatic drills and similar tools such, for example, as that shown in my copending application Serial No. 9,392, filed February 16, 1925. These rods are universally connected at one end with the pistons of a pressure fluid motor, and at their other ends with a gyrating member forming part of a transmission to a rotary tool spindle. The motors operate at high speed so that it is desirable to reduce as much as possible the mass of the reciprocating parts.

The primary object of my invention, therefore, is to produce a piston rod having a bearing ball at either or both ends, which is made hollow so as to reduce the weight of the rod.

A further object is to produce an improved method of making piston rods of the character set forth in which the major operation is performed by shaping dies so as to reduce the cost of manufacture.

The objects of my invention thus generally stated, together with other and ancillary objects are obtained by the construction and arrangement illustrated in the accompanying drawings forming part hereof, in which:

Figure 1 is a fragmentary elevational section of a piece of rod stock having its opposite ends bored to produce hollow end portions from which the bearing balls may be formed.

Fig. 2 is a similar view after the stock has been formed to produce an intermediate connecting shank of small cross sectional area.

Figs. 3 and 4 are sectional views illustrating two operations performed on the hollow ends of the rod to shape the bearing balls.

Fig. 5 is a side view of a completed rod.

As shown in Fig. 5, my improved rod comprises a shank or stem 7 having in the present instance bearing balls 8 and 8' at opposite ends, each of which is made hollow to reduce the weight of the rod as a whole.

The preferred manner of producing a hollow ball on the end of a rod consists in boring in the end of a piece of solid rod stock 9 a hole or socket 10. The hole is in each instance bored to a depth slightly greater than the diameter of the bearing ball to be formed, and the end of the rod is counter-bored to provide an outwardly tapering end portion or lip 11. The stock is next formed in a lathe or the like to reduce the portion between the bored ends to a relatively small cross sectional area and thus provide the stem 7 having at its opposite ends bell-like heads 12. The portions of the heads adjacent the stem 7 are in this operation preferably rounded to form semi-spheres.

The operation of forming the ball from the bell-shaped head 12 is preferably performed in two steps. The first (Fig. 3) consists in placing the head between two dies A and B of suitable character, the die B being made in two sections each of which is grooved at $b$ to form, when the sections are placed together, a hole for receiving the portion of the shank or stem 7 adjacent the head. When the die blocks A and B are brought together the open end of the head 12 is shaped by forcing the peripheral wall of the head near its outer end inwardly until the head is substantially closed. At this stage of the operation, the head has assumed a substantially spherical form, the proportioning of the parts being such that a small hole 13 is left in the end of the ball. If desired, however, the parts may be proportioned so as completely to close the end of the ball. The tapering or beveling of the inner peripheral wall of the hole 10 in the stock preliminary to the forming operation enables a more complete and effective closing of the head in the formation of the ball.

The second stage of the forming operation is accomplished by means of dies A' and B' operating against the sides of the ball as distinguished from against the ends of the ball as in Fig. 3. In this instance, the adjacent faces of the die blocks are grooved as at $a'$ and $b'$ to provide a passage for the stem or shank 7. This operation completes the formation of the ball, serving to shape it into a true sphere.

In practice the stock from which the piston rod is made is of a diameter slightly less than the diameter of the bearing balls to be formed. For example, for a ball having a diameter of $\frac{9}{16}''$ stock of a diameter of $\frac{1}{2}''$ is employed. This is possible because in the shaping operation the metal undergoes a slight expansion.

It will be observed that the piston rod thus produced with hollow bearing balls is not only substantially lighter in weight than a rod having solid balls, but the formation of the balls by shaping dies instead of in a turning machine is substantially less expensive.

I claim as my invention:

1. The method of making piston rods which consists in boring the end of a piece of solid round stock, reducing the cross sectional area of the stock adjacent the end of the bore so as to form a shank having a head thereon approximately bell shaped in form, applying spherically concave compression members to said head to effect the axial compression of the open end of said head inwardly, and applying spherically concave compression members of less diameter laterally to said head to effect compression thereof into a spherical bearing ball on said shank.

2. The method of making piston rods and the like which consists in forming in a piece of solid round stock a shank having a hollow cylindrical head of less diameter than the finished bearing ball to be produced therefrom, applying spherically concave compression members of greater diameter than the bearing ball to be produced axially of said head to effect compression of the open end thereof inwardly and endwardly toward said shank, and applying spherically concave compression members of like diameter to the bearing ball to be produced therefrom laterally of said head to produce a spherical bearing ball on said shank.

3. The method of making piston rods which consists in forming a shank having an annular head open at its outer end, tapering the marginal end portion of said head, axially compressing the open end portion of said head inwardly toward said shank to shape said head into spherical form, and laterally compressing said head to produce a spherical bearing ball of less diameter than that produced by said axial compression.

In testimony whereof, I have hereunto affixed my signature.

ERNEST H. SHAFF.